US 6,720,877 B2

(12) United States Patent
Lian et al.

(10) Patent No.: US 6,720,877 B2
(45) Date of Patent: Apr. 13, 2004

(54) MANUFACTURING METHODS OF MAGNETOMECHANICAL ELECTRONIC ARTICLE SURVEILLANCE MARKERS (75) Inventors: Ming-Ren Lian, Boca Raton, FL (US); Norm Hansen, Boca Raton, FL (US); Eugenio Morgado, Boca Raton, FL (US); Hubert A. Patterson, Boca Raton, FL (US); Robert Simone, Boca Raton, FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 400 days.

(21) Appl. No.: 09/821,398

(22) Filed: Mar. 29, 2001

(65) Prior Publication Data
US 2002/0140558 A1 Oct. 3, 2002

(51) Int. Cl.[7] .............................................. G08B 13/14
(52) U.S. Cl. .................................. 340/572.8; 340/572.6
(58) Field of Search .................... 340/572.6, 572.8, 340/572.1; 372/45, 46, 50; 356/464; 359/290, 291; 148/108; 29/602.1, 25, 35

(56) References Cited
U.S. PATENT DOCUMENTS

| | | | |
|---|---|---|---|
| 4,510,489 A | 4/1985 | Anderson et al. | 340/572 |
| 4,840,758 A | 6/1989 | Thorsrud | 264/26 |
| 4,880,963 A * | 11/1989 | Yamashita | 235/449 |
| 4,882,569 A * | 11/1989 | Dey | 340/572 |
| 5,049,323 A | 9/1991 | Giles | 264/25 |
| 5,082,436 A | 1/1992 | Choi et al. | 425/174.8 |
| 5,160,396 A | 11/1992 | Jensen et al. | 156/304.2 |
| 5,306,377 A | 4/1994 | Jensen et al. | 156/304.2 |
| 5,360,330 A | 11/1994 | Jensen et al. | 425/144 |
| 5,843,253 A * | 12/1998 | Stivani | 156/64 |
| 6,031,459 A * | 2/2000 | Lake | 340/572.8 |
| 6,067,016 A | 5/2000 | Deschenes et al. | 340/572.8 |

FOREIGN PATENT DOCUMENTS

WO   WO 97/45820   12/1997   .......... G08B/13/24

* cited by examiner

*Primary Examiner*—Anh V La (57) ABSTRACT

A method of making a magnetomechanical electronic article surveillance marker is provided that, in one embodiment, includes deposition or placing of at least one elongated bias magnet onto a substrate, depositing a cavity layer onto the substrate where the cavity layer defines an elongated cavity adjacent the bias magnet. Placing a magnetomechanical resonator into the cavity and sealing a cover onto the cavity layer wherein the resonator is captured in the cavity and free to mechanically vibrate substantially unencumbered. The substrate itself may be magnetic thereby eliminating a separate bias magnet. In an alternate embodiment, a cavity is molded in a plastic substrate sized to fit a resonator, and a cover is sealed to the substrate to capture a resonator in the cavity. At least one bias magnet is placed onto the cover adjacent the cavity and a second cover is sealed to the substrate, to the first cover, and to the bias fixing the bias in place adjacent the cavity.

26 Claims, 8 Drawing Sheets

MANUFACTURING METHODS OF MAGNETOMECHANICAL ELECTRONIC ARTICLE SURVEILLANCE MARKERS

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to markers and labels for electronic article surveillance (EAS) systems, and more particularly to manufacturing methods for magnetomechanical and magnetoacoustic EAS markers and labels using RF molding and deposition.

2. Description of the Related Art

U.S. Pat. No. 4,510,489, the '489 patent, discloses an EAS marker made of an elongated strip of magnetostrictive ferromagnetic material disposed adjacent to a ferromagnetic element that, when magnetized, magnetically biases the strip and arms it to resonate mechanically at a preselected resonant frequency. The marker resonates when subjected to an interrogation field at a frequency at or near the marker's resonant frequency. The response of the marker at the marker's resonant frequency can be detected by EAS receiving equipment, thus providing an electronic marker for use in EAS systems. As used herein, the term "marker" refers to, and is used interchangeably with, markers, labels, and tags used to trigger EAS systems.

The marker of the '489 patent is constructed of a resonator, an elongated ductile strip of magnetostrictive ferromagnetic material disposed adjacent a ferromagnetic element. The ferromagnetic element is a high coercivity biasing magnet that, when magnetized, is capable of applying a DC magnetic bias field to the resonator. The resonator is placed within a hollow recess or cavity of the marker housing with the bias held in an adjacent plane parallel to the resonator so that the bias does not cause mechanical interference with the vibration of the resonator. Because the resonator must vibrate freely within its cavity and the bias is maintained in a parallel adjacent plane, the marker has a required minimum thickness to accommodate the adjacent parallel planes and permit free vibration of the resonator.

Figure 1:
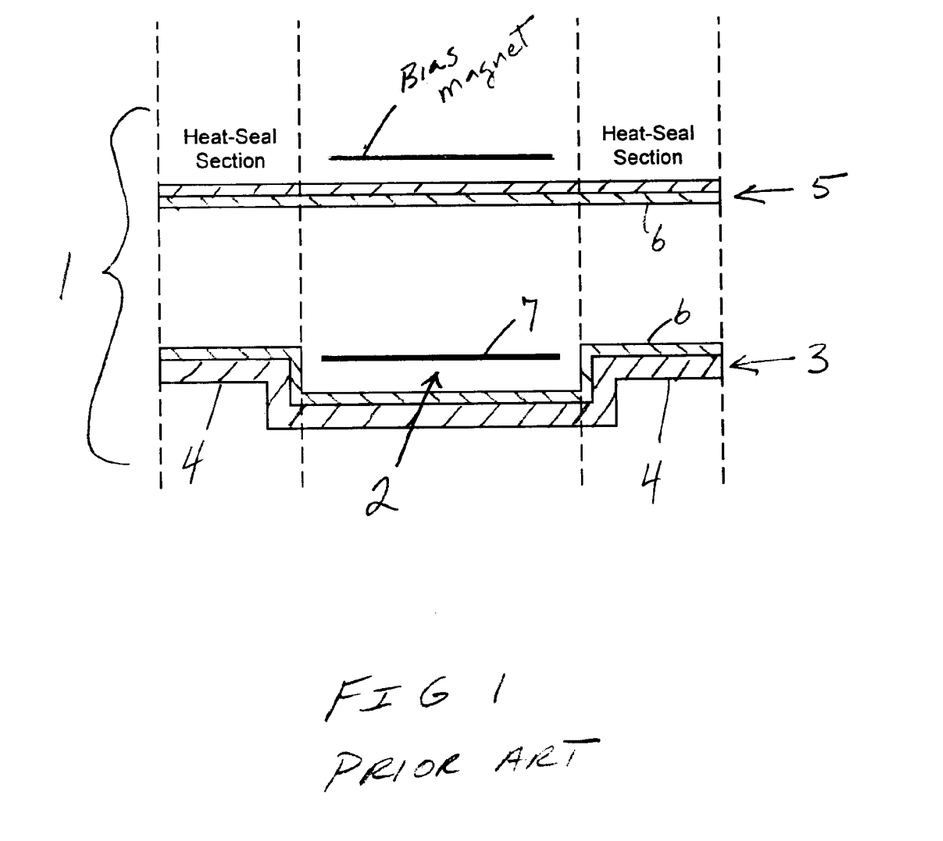
FIG. 1 illustrates a prior art method of assembly of an EAS marker.

Presently, the EAS markers described above are manufactured using a vacuum thermal forming process. Referring to FIG. 1, the resonator cavity 2 is formed from a flat planar plastic material 3, and results in a flange 4 extending around the cavity perimeter to which the lid material 5 is thermo-sealed. The lid 5 tends to sag toward the cavity 2, and the label 1 has a tendency to bow due to shrinkage in the polymer laminates 6 during the thermo-sealing process effectively reducing the depth of the cavity 2. The resonator cavity 2 must be made deeper to compensate for this cavity depth reduction to permit mechanical freedom for the resonator 7. Since the thermo-formed cavity 2 essentially rises out of the plane of its flanges 4, it can be crushed by applied pressure such as by stacking merchandise or vandalism. Crushing the resonator cavity 2 prevents the resonator 7 from freely moving when resonating. The quality of the cavity formation can be improved.

In addition, there are EAS marker applications in which a flat marker is desired. A flat EAS marker is defined herein as an EAS marker of lower minimum thickness than is required to accommodate a bias and a resonator that are maintained in stacked parallel adjacent planes as described above. A flat marker can provide a larger surface area for the attachment of indicia, and may be more bendable. U.S. patent application Ser. No. 09/584,559, the '559 application, assigned to Sensormatic Electronics Corporation, discloses a "side-by-side" bias configuration that results in flat magnetomechanical EAS marker. The disclosure of the '559 application is incorporated herein by reference in its entirety. The '559 application includes disclosure of manufacturing methods for flat EAS markers. Improved manufacturing methods are desired.

BRIEF SUMMARY OF THE INVENTION

A first aspect of the invention is a method of making a magnetomechanical electronic article surveillance marker that includes deposition of at least one elongated bias magnet onto a substrate, depositing a cavity layer onto the substrate where the cavity layer defines an elongated cavity adjacent the bias magnet. Placing a magnetomechanical resonator into the cavity and sealing a cover onto the cavity layer wherein the resonator is captured in the cavity and free to mechanically vibrate substantially unencumbered.

Further, two elongated bias magnets can be deposited on the substrate layer in parallel relation to each other, the elongated cavity can be defined between the two elongated bias magnets. A resonator support member can be deposited in the cavity that rests against a mechanical vibration nodal point of the resonator when the resonator is disposed in the cavity to support the resonator without substantially encumbering mechanical vibration thereof. The elongated bias magnet and the cavity layer can be deposited on opposite sides of the substrate. A first portion of the cavity layer can be deposited on the substrate and a second portion of the cavity layer can be deposited on the cover where sealing connects the first and second cavity layer portions together defining the cavity so the cavity is substantially impervious to restricting the resonator. An adhesive layer can be deposited on the cavity layer prior to sealing a cover onto the cavity layer.

A second aspect of the invention is a method of making a magnetomechanical electronic article surveillance marker that includes placing at least one elongated bias magnet on a substrate layer, depositing a cavity layer on the substrate that covers and attaches the bias magnet to the substrate and defines an elongated cavity adjacent the bias magnet. Placing a magnetomechanical resonator in the cavity and sealing a cover onto the cavity layer where the resonator is captured in the cavity and free to mechanically vibrate unencumbered.

Further, two elongated bias magnets can be placed on the substrate layer in parallel relation to each other with the elongated cavity defined between the two elongated bias magnets. A resonator support member can be deposited in the cavity to rest against a mechanical vibration nodal point of the resonator when the resonator is disposed in the cavity thereby supporting the resonator without substantially encumbering mechanical vibration thereof. A first portion of the cavity layer is deposited on the substrate and a second portion of said cavity layer is deposited on the cover where sealing connects the first and second cavity layer portions together defining the cavity where the cavity is substantially impervious to restricting the resonator. An adhesive layer can be deposited on the cavity layer prior to sealing a cover onto the cavity layer.

A third aspect of the invention is a method of making a magnetomechanical electronic article surveillance marker that includes depositing a cavity layer on a magnetizable substrate layer, the cavity layer defining an elongated cavity. A resonator support member can be deposited in the cavity. Placing a magnetomechanical resonator in the cavity, the resonator support member being disposed between the resonator and the magnetizable substrate layer, and sealing a cover onto the cavity layer wherein the resonator is captured in the cavity and free to mechanically vibrate unencumbered.

Further, the resonator support member is adapted to rest against a mechanical vibration nodal point of the magnetomechanical resonator when the resonator is disposed in the cavity thereby supporting the resonator without substantially encumbering mechanical vibration thereof.

A fourth aspect of the invention is a method of making a magnetomechanical electronic article surveillance marker including molding a cavity in a plastic substrate, the cavity sized to receive a magnetomechanical resonator, the substrate sized relatively slightly larger than the magnetomechanical resonator. Placing the magnetomechanical resonator into the cavity and sealing a first cover layer to the plastic substrate wherein the resonator is captured in the cavity and free to mechanically vibrate unencumbered, the first cover layer being sized larger than the plastic substrate. Placing at least one bias magnet on the first cover layer adjacent the plastic substrate and sealing a second cover layer to the plastic substrate, to the bias magnet, and to the first cover layer, where the bias magnet is held substantially fixed in position relative to the resonator.

Further, the second cover layer can be an adhesive layer. Two bias magnets are placed on the first cover layer, the plastic substrate disposed adjacent and between the bias magnets, and the second cover layer sealing both of the bias magnets in a position substantially fixed relative to the resonator. The cavity is molded using RF molding.

A fifth aspect of the invention is a method of making a magnetomechanical electronic article surveillance marker including placing at least one bias magnet on a plastic substrate, and molding a cavity in the plastic substrate adjacent the bias magnet. The cavity sized to receive a magnetomechanical resonator, the bias magnet being embedded into the plastic substrate substantially simultaneously with the cavity formation. Placing a magnetomechanical resonator into the cavity and sealing a cover layer to the plastic substrate where the resonator is captured in the cavity and free to mechanically vibrate unencumbered.

Further, two bias magnets are placed on the plastic substrate and the cavity is molded between the bias magnets, both of the bias magnets can be embedded into the plastic substrate. A resonator support member can be molded into the cavity wherein the resonator support member is adapted to rest against a mechanical vibration nodal point of the resonator when the resonator is disposed in the cavity thereby supporting the resonator without substantially encumbering mechanical vibration thereof. The cavity is molded using RF molding.

A sixth aspect of the invention is a method of making a magnetomechanical electronic article surveillance marker including molding a resonator cavity and a bias cavity in a plastic substrate using RF molding. The resonator cavity is sized to receive a magnetomechanical resonator, the bias cavity sized to receive a bias magnet. Placing a magneto-mechanical resonator into the resonator cavity, and placing a bias magnet into the bias cavity, and sealing a cover layer to the plastic substrate where the resonator is captured in the cavity and free to mechanically vibrate unencumbered and the bias magnet is retained in a substantially fixed position.

Further, molding includes molding two bias cavities and a bias magnet is placed in each bias cavity, each bias magnet being retained in a substantially fixed position by the cover layer. The cover layer can be sealed to the plastic substrate using ultrasound.

Objectives, advantages, and applications of the present invention will be made apparent by the following detailed description of the preferred embodiments of the invention.

DETAILED DESCRIPTION OF THE INVENTION

Figure 2:
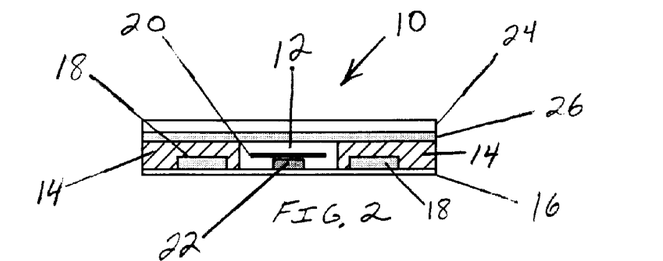
FIG. 2 is a front elevational view, in cross-section, of one embodiment of the present invention.
Figure 3:
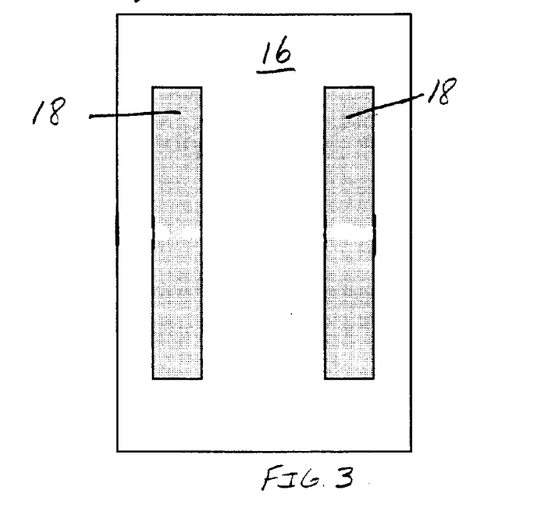
FIG. 3 is a fragmentary top plan view illustrating the substrate and bias magnets of the embodiment shown in FIG. 2.
Figure 4:
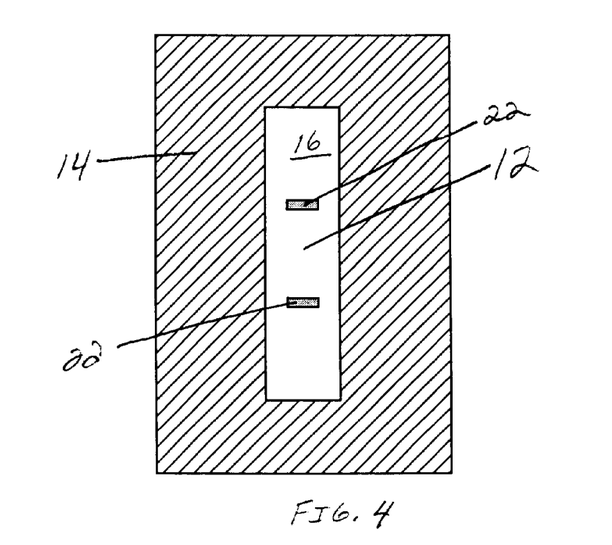
FIG. 4 is a fragmentary top plan view illustrating the cavity layer and resonator supports of the embodiment shown in FIG. 2.

Referring to FIGS. 2, 3, and 4, a first aspect of the present invention is illustrated generally at 10. The resonator cavity 12 is formed by printing or depositing a cavity layer 14, made of a suitable material such as a polymer-based paste, onto a substrate 16. Cavity layer 14 can be applied using multiple passes to reach the required cavity depth, followed by a suitable low-temperature curing process. Substrate 16 can be a suitable thin plastic or paper material. Prior to depositing the cavity layer 14, one or more bias magnets 18 are placed onto substrate 16. Bias magnets 18 can be formed by depositing a magnetic material, such as a polymer-based paste mixed with a magnetic powder, onto substrate 16. Cavity layer 14 forms cavity 12 and attaches bias magnets 18 to substrate 16. Once cavity layer 14 forms resonator cavity 12 on substrate 16, one or more resonators 20 are placed into cavity 12. Resonator support members 22 can be glued or deposited onto substrate 16 to support resonator 20. Resonator support members 22 are adapted to rest against resonator 20 in mechanical resonance nodal points so resonator 20 will not be restricted during resonance. The exact position of support members 22 in cavity 12 is determined by the designed resonant frequency of EAS marker 10. Once resonator 20 is placed into cavity 12, a suitable sealing method, such as thermal, UV, RF, or ultrasound, is used to seal a cover over cavity 12. For example, a polymer sheet laminate made of a thin carrier 24 and a heat activated adhesive layer 26 can be thermal sealed to cavity layer 14 to seal resonator 20 within cavity 12. Resonator 20 is thus captured within cavity 12 and free to mechanically vibrate unencumbered.

In alternate configurations, a single bias magnet 18, or a plurality of smaller bias magnets can be placed on substrate 16 to bias resonator 20. Bias magnet 18 can be deposited directly under cavity 12, on the side of substrate 16 opposite cavity 12.

Figure 5:
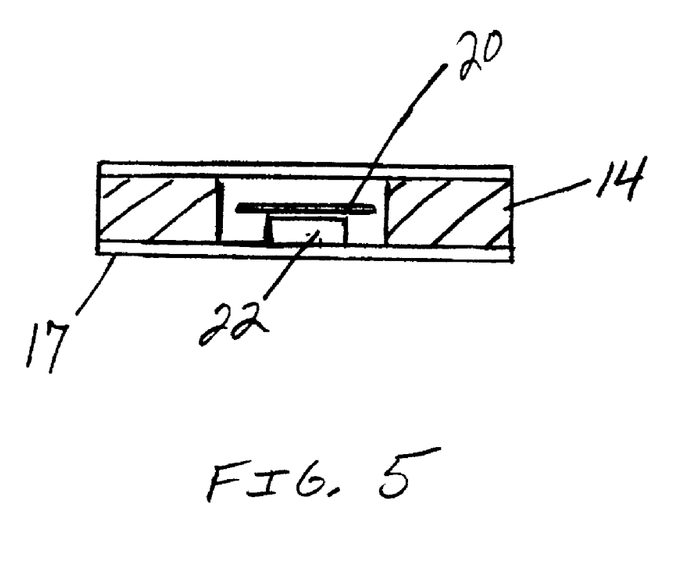
FIG. 5 is a front elevational view, in cross-section, of an alternate configuration for the embodiment shown in FIG. 2.

Referring to FIG. 5, cavity layer 14 can be deposited directly onto a magnetic substrate 17 thereby eliminating the need for bias magnets 18. In this configuration, resonator support members 22, or another suitable separator layer, is required to keep resonator 20 from coming directly into contact with magnetic substrate 17, which would inhibit free vibration of the resonator 20.

Referring again to FIG. 2, the quality of the adhesion between the cavity layer 14 and the cover sheet 24 is very important. Insufficient adhesion could leave a gap between the cavity layer 14 and cover sheet 24. Failure of marker operation may result when the flat, thin resonator 20 wedges into the gap and is unable to freely vibrate. An overabundance of adhesive 26 will cause it to overflow into the cavity 12, which can interfere with the free vibrations of resonator 20.

Figure 6:
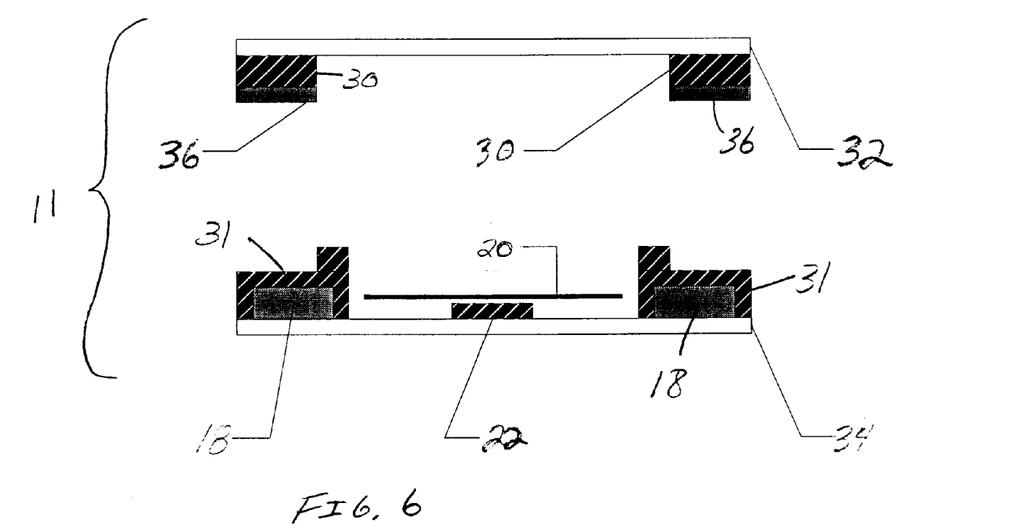
FIG. 6 is an exploded front elevational view of an alternate embodiment of the present invention.
Figure 7:
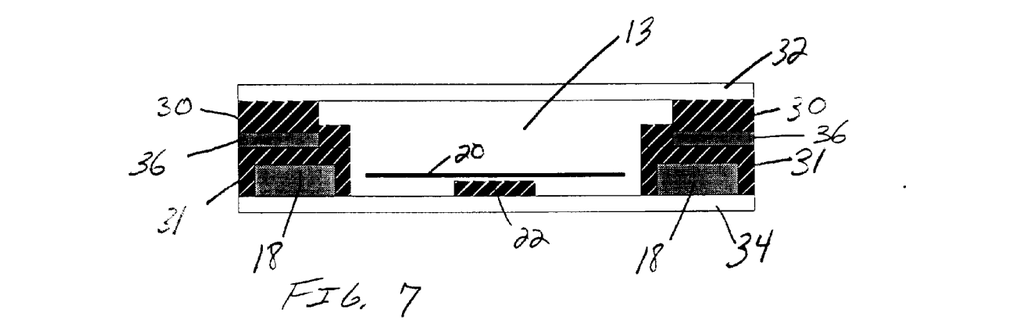
FIG. 7 is a front elevational view, in cross-section, of the embodiment shown in FIG. 6.

Referring to FIGS. 6, and 7 an alternate configuration of the invention is illustrated in which EAS marker 11 includes a portion of the cavity layer 30 deposited on cover sheet 32, and a portion of cavity layer 31 is deposited on substrate 34. When cover sheet 32 is placed over substrate 34, adhesive layer 36, which can be deposited to cavity layer portion 30, connects cavity layer portion 30 to cavity layer portion 31 to form cavity 13 and capture resonator 20 therein. As described above, bias magnets 18 and resonator support members 22 can be placed or deposited on substrate 34. The cavity structure 13, formed as a result of attaching cavity layer portions 30 and 31 together, does not form a gap that can trap resonator 20 and prevent free vibration.

The EAS marker, 10 and 11, built with a deposited cavity layer will be relatively flat in comparison with prior art markers, because the cavity is not vacuum formed from a thin, polymer sheet as shown in FIG. 1. Without a stepped cavity 2, the label is less likely to be crushed due to stacking or intentional vandalism. The flat exterior surface is also suitable for the printing of UPC codes and other indicia.

Figure 8:
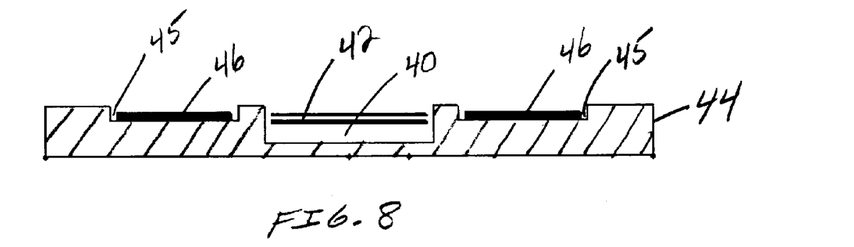
FIG. 8 is a partial front elevational view, in cross-section, of an alternate embodiment of the present invention.

Referring to FIG. 8, in manufacturing flat EAS markers, the mechanical condition of the housing cavity 40 is important to the performance of resonator 42. An RF molded cavity provides a rigid cavity with a well-defined edge, so that a typical 1-mil thick resonator 42 does not wedge into a joint, or be mechanically damped due to a deformed cavity. FIG. 8 shows an example of an RF molded cavity 40. The marker consists of an RF molded housing 44, which includes a resonator cavity 40 and at least one bias cavity 45. The magnetic component in the center is the functional unit of one or more magnetoacoustic resonators 42, which under proper conditions becomes an efficient transducer to convert energy from a magnetic field into mechanical vibrations. The remaining two magnetic components are semihard magnets, called bias magnets 46. Once magnetized, the bias magnets 46 retain a large portion of their magnetic strength, and provide the essential magnetic bias field for the resonator 42 to function. The side by side design of a flat EAS marker minimizes the magnetic attraction between the magnetic bias 46 and the resonator 42. After the resonator 42 and bias magnets 46 are deposited into cavities 40 and 45, respectively, a cover is sealed over the plastic molded housing 44 to capture resonator 42, and retain bias magnets 46 in place.

Figure 9:
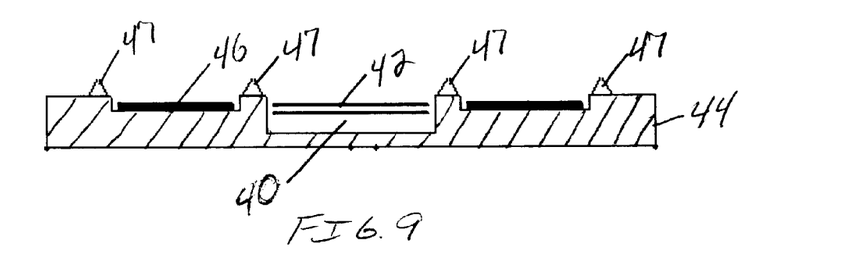
FIG. 9 is a partial front elevational view, in cross-section, of the embodiment shown in FIG. 8, illustrating additional features.
Figure 10:
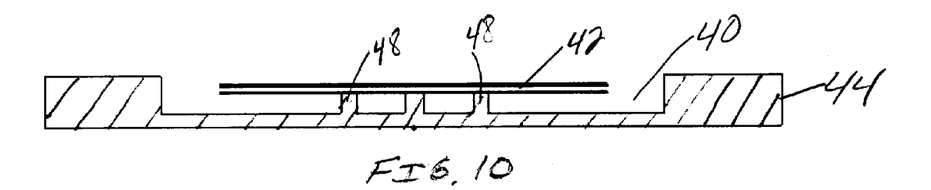
FIG. 10 is a partial side elevational view, in cross-section, of the embodiment shown in FIG. 8, illustrating additional features.

Referring to FIG. 9, raised structures 47 can be molded in housing 44 to direct energy for ultrasound-sealing of the cover. Referring to FIG. 10, resonator support members 48 can be molded into housing 44 to provide support for resonators 42. Resonator support members 48 are adapted to support resonators 42 at or near mechanical vibration nodal points as determined by the resonant frequency of the marker to reduce signal loss due to friction.

Figure 11:
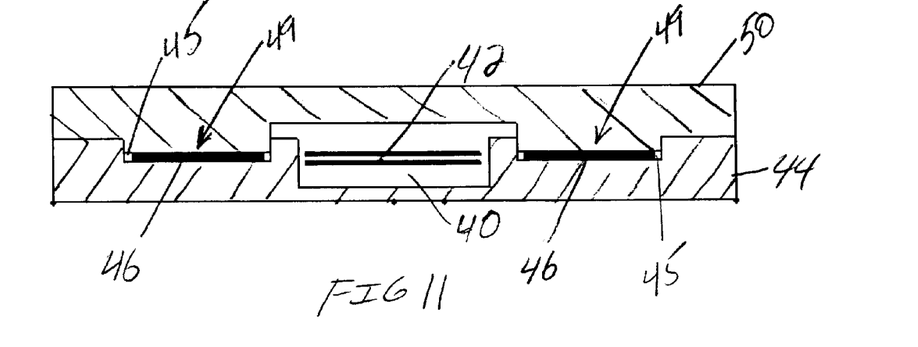
FIG. 11 is a front elevational view, in cross-section, of the embodiment shown in FIG. 8, illustrating additional features.

Referring to FIG. 11, bias magnet cavities 45 can be molded slightly deeper so that interlocking members 49 can be molded on cover 50 to lock cover 50 onto housing 44 creating a more rigid and seamless resonator cavity 40.

Figure 12:
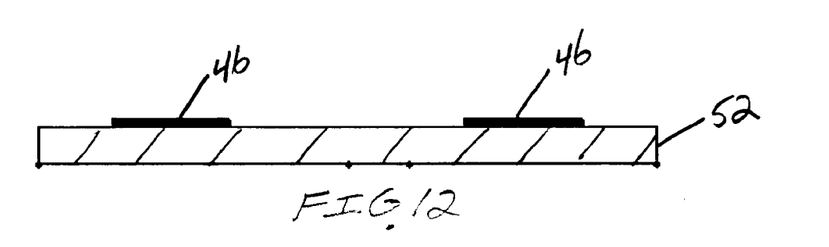
FIG. 12 is a front elevational view, in cross-section, of an alternate embodiment of the present invention prior to molding.
Figure 13:
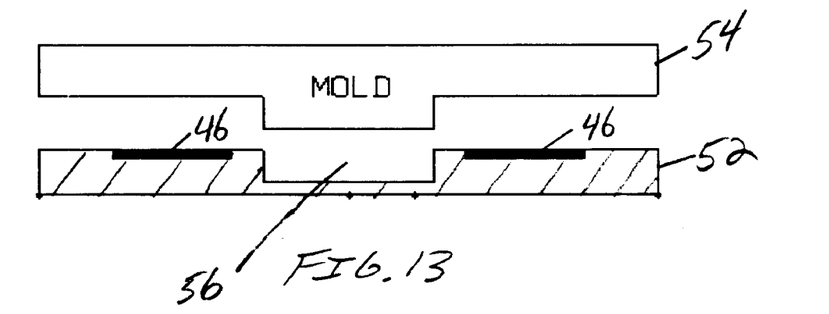
FIG. 13 is a front elevational view, in cross-section, of the embodiment of FIG. 12 after molding.

Referring to FIG. 12, an alternate RF molding method is illustrated where at least one bias magnet 46 is placed upon a plastic housing substrate 52 prior to the RF molding process. Referring to FIG. 13, during the molding cycle, the plastic housing material 52 is heated by RF energy, and mold 54 forms resonator cavity 56 and simultaneously compresses the bias strips 46 into the molten plastic housing substrate 52, which solidifies shortly after the RF power is turned off. In this example, only one cavity formation is required, and may result in a thinner label.

Figure 14:
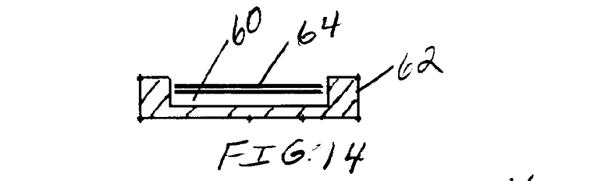
FIG. 14 is a partial, front elevational view, in cross-section, of an alternate embodiment of the present invention.
Figures 15, 16:
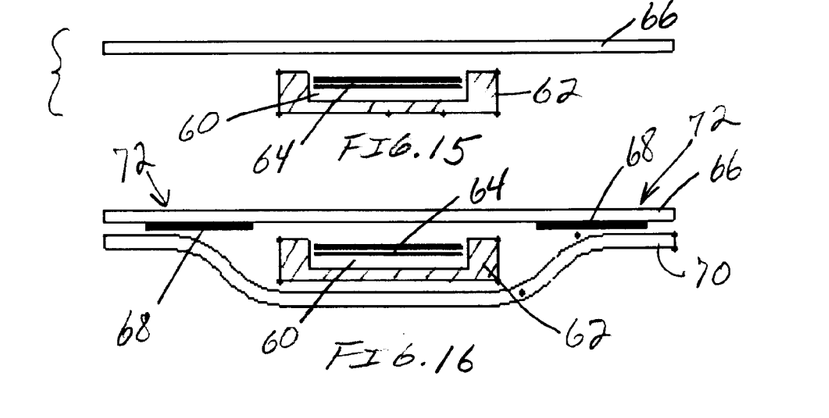
FIG. 15 is a partial, exploded, front elevational view, in cross-section, of the embodiment of FIG. 14.
FIG. 16 is a front elevational view, in cross-section, of the embodiment of FIG. 14.

Referring to FIGS. 14, 15 and 16, an alternate method for making a flat EAS marker is illustrated. A resonator cavity 60 is RF molded in a narrow strip of plastic housing material 62. At least one resonator 64 is placed into cavity 60, and a cover sheet 66 is sealed to the plastic housing substrate 62, as shown in FIG. 15. Referring to FIG. 16, at least one bias strip 68 is placed and adhered to the cover sheet 66, adjacent cavity 60, before or after the sealing process. Finally, a second cover sheet 70, which can be a pressure sensitive adhesive, is used to seal the label as shown in FIG. 16. The embodiment illustrated in FIGS. 14, 15, and 16 is adapted to improve placement of the resulting EAS marker onto curved surfaces such as wine bottles, cans, and the like. Cover sheet 66 is significantly wider than cavity 60 to provide two wings 72, which can adhere to the curved surfaces better than a rigid label structure.

Figure 17:
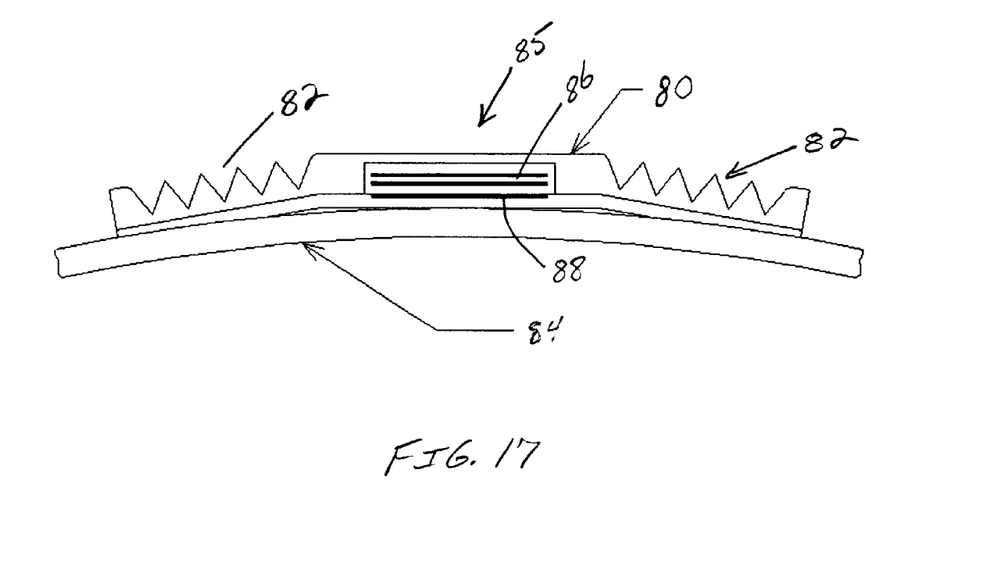
FIG. 17 is a front elevational view of an alternate embodiment of the present invention attached to a curved surface.

Referring to FIG. 17 an alternate embodiment for an EAS marker 85 for attachment to curved surfaces is illustrated. RF molded housing 80 includes flexible sections 82 that are adapted to wrap around the curved surface 84 to which the marker 85 is to be attached. Flexible sections 82 can be formed by cuts in the housing material as illustrated. In this embodiment, resonators 86 are in parallel adjacent planes with bias magnet 88, but could be configured in a side by side configuration with the bias magnets located in the region of the cut sections 82.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the forgoing disclosure.

What is claimed is:

1. A method of making a magnetomechanical electronic article surveillance marker, comprising:

providing a substrate layer;

depositing an elongated bias magnet on said substrate layer;

depositing a cavity layer on said substrate layer, said cavity layer defining an elongated cavity adjacent said bias magnet;

placing a magnetomechanical resonator in said cavity; and, sealing a cover onto said cavity layer wherein said resonator is captured in said cavity and free to mechanically vibrate substantially unencumbered.

2. The method of claim 1 wherein two elongated bias magnets are deposited on said substrate layer in parallel relation to each other, said elongated cavity being defined between said two elongated bias magnets.

3. The method of claim 1 further including depositing a resonator support member in said cavity, said resonator support member adapted to rest against a mechanical vibration nodal point of said resonator when said resonator is disposed in said cavity thereby supporting said resonator without substantially encumbering mechanical vibration thereof.

4. The method of claim 1 wherein said elongated bias magnet and said cavity layer are deposited on opposite sides of said substrate layer.

5. The method of claim 1 wherein a first portion of said cavity layer is deposited on said substrate layer and a second portion of said cavity layer is deposited on said cover, said sealing act connects said first and said second cavity layer portions together defining said cavity wherein said cavity is substantially impervious to restricting said resonator.

6. The method of claim 1 further including the act of depositing an adhesive layer on said cavity layer prior to the act of sealing a cover onto said cavity layer.

7. A method of making a magnetomechanical electronic article surveillance marker, comprising:

providing a substrate layer;

placing an elongated bias magnet on said substrate layer;

depositing a cavity layer on said substrate layer, said cavity layer covering and attaching said bias magnet to said substrate layer and defining an elongated cavity adjacent said bias magnet;

placing a magnetomechanical resonator in said cavity; and, sealing a cover onto said cavity layer wherein said resonator is captured in said cavity and free to mechanically vibrate unencumbered.

8. The method of claim 7 wherein two elongated bias magnets are placed on said substrate layer in parallel relation to each other, said elongated cavity being defined between said two elongated bias magnets.

9. The method of claim 7 further including depositing a resonator support member in said cavity, said resonator support member adapted to rest against a mechanical vibration nodal point of said resonator when said resonator is disposed in said cavity thereby supporting said resonator without substantially encumbering mechanical vibration thereof.

10. The method of claim 7 wherein a first portion of said cavity layer is deposited on said substrate layer and a second portion of said cavity layer is deposited on said cover, said sealing act connects said first and said second cavity layer portions together defining said cavity wherein said cavity is substantially impervious to restricting said resonator.

11. The method of claim 7 further including the act of depositing an adhesive layer on said cavity layer prior to the act of sealing a cover onto said cavity layer.

12. A method of making a magnetomechanical electronic article surveillance marker, comprising:

providing a magnetizable substrate layer;

depositing a cavity layer on said substrate layer, said cavity layer defining an elongated cavity;

depositing a resonator support member in said cavity;

placing a magnetomechanical resonator in said cavity, said resonator support member being disposed between said resonator and said magnetizable substrate layer; and, sealing a cover onto said cavity layer wherein said resonator is captured in said cavity and free to mechanically vibrate unencumbered.

13. The method of claim 12 wherein said resonator support member is adapted to rest against a mechanical vibration nodal point of said magnetomechanical resonator when said resonator is disposed in said cavity thereby supporting said resonator without substantially encumbering mechanical vibration thereof.

14. A method of making a magnetomechanical electronic article surveillance marker, comprising:

molding a cavity in a plastic substrate, said cavity sized to receive a magnetomechanical resonator, said substrate sized relatively slightly larger than said magnetomechanical resonator;

placing said magnetomechanical resonator into said cavity;

sealing a first cover layer to said plastic substrate wherein said resonator is captured in said cavity and free to mechanically vibrate unencumbered, said first cover layer being sized larger than said plastic substrate;

placing a bias magnet on said first cover layer adjacent said plastic substrate; and, sealing a second cover layer to said plastic substrate, to said bias magnet, and to said first cover layer, wherein said bias magnet is held substantially fixed in position relative to said resonator.

15. The method of claim 14 wherein said second cover layer is an adhesive layer.

16. The method of claim 14 wherein two bias magnets are placed on said first cover layer, said plastic substrate disposed adjacent and between said bias magnets, said second cover layer sealing both of said bias magnets in a position substantially fixed relative to said resonator.

17. The method of claim 14 wherein said cavity is molded using RF molding.

18. A method of making a magnetomechanical electronic article surveillance marker, comprising:

placing a bias magnet on a plastic substrate;

molding a cavity in said plastic substrate adjacent said bias magnet, said cavity sized to receive a magnetomechanical resonator, said bias magnet being embedded into said plastic substrate substantially simultaneously with said cavity formation;

placing a magnetomechanical resonator into said cavity;

sealing a cover layer to said plastic substrate wherein said resonator is captured in said cavity and free to mechanically vibrate unencumbered.

19. The method of claim 18 wherein two bias magnets are placed on said plastic substrate and said cavity is molded between said bias magnets, both of said bias magnets being embedded into said plastic substrate.

20. The method of claim 18 wherein said molding act includes the formation of a resonator support member in said cavity wherein said resonator support member adapted to rest against a mechanical vibration nodal point of said resonator when said resonator is disposed in said cavity thereby supporting said resonator without substantially encumbering mechanical vibration thereof.

21. The method of claim 18 wherein said cavity is molded using RF molding.

22. A method of making a magnetomechanical electronic article surveillance marker, comprising:

molding a resonator cavity and a bias cavity in a plastic substrate using RF molding, said resonator cavity sized to receive a magnetomechanical resonator, said bias cavity sized to receive a bias magnet;

placing a magnetomechanical resonator into said resonator cavity, and placing a bias magnet into said bias cavity;

sealing a cover layer to said plastic substrate wherein said resonator is captured in said cavity and free to mechanically vibrate unencumbered and said bias magnet is retained in a substantially fixed position.

23. The method of claim 22 wherein said molding act includes molding two bias cavities and a bias magnet is placed in each bias cavity, each bias magnet being retained in a substantially fixed position by said cover layer.

24. The method of claim 22 wherein said cover layer is sealed to said plastic substrate using ultrasound.

25. A magnetomechanical electronic article surveillance marker, comprising:

an EAS marker housing having a cavity sized to receive a magnetomechanical resonator, said magnetomechanical resonator disposed in said cavity;

a cover sealed to said housing and capturing said resonator within said cavity; a bias magnet disposed adjacent said resonator;

said housing including a relatively flexible portion adjacent said cavity, said flexible portion adapted to bend around a curved surface to facilitate attaching the marker to the curved surface.

26. The marker of claim 25 wherein said cavity and said relatively flexible portion are RF molded into said EAS marker housing.

* * * * *